United States Patent [19]
Awaji

[11] Patent Number: 6,090,183
[45] Date of Patent: Jul. 18, 2000

[54] METHOD AND APPARATUS FOR PROCESSING EXHAUST GAS PRODUCED DURING MANUFACTURING OF SEMICONDUCTOR DEVICES

[76] Inventor: Toshio Awaji, 4-130-banchi, Hikino-cho 2-cho, Sakai-shi, Osaka-fu, Japan

[21] Appl. No.: 09/160,381

[22] Filed: Sep. 25, 1998

[51] Int. Cl.[7] ................................................ B01D 33/15
[52] U.S. Cl. ........................... 95/35; 95/270; 95/282; 55/320; 55/329; 55/333; 55/477
[58] Field of Search ........................... 95/225, 270, 282, 95/31, 34, 35, 269, 286, 287; 55/385.1, 385.2, 329, 333, 477, 317, 320

[56] References Cited

U.S. PATENT DOCUMENTS

| | | | |
|---|---|---|---|
| 5,462,585 | 10/1995 | Niskanen et al. | 95/270 |
| 5,536,298 | 7/1996 | Awaji | 95/270 |
| 5,562,758 | 10/1996 | Awaji | 95/270 |
| 5,649,985 | 7/1997 | Imamura | 95/225 |
| 5,716,428 | 2/1998 | Imamura | 95/225 |
| 5,900,043 | 5/1999 | Grandjean et al. | 95/282 |

*Primary Examiner*—David A. Simmons
*Assistant Examiner*—Minh-Chau T. Pham
*Attorney, Agent, or Firm*—Ronald E. Greigg; Edwin E. Greigg

[57] ABSTRACT

A method for processing an exhaust gas produced during manufacturing of semiconductor devices including the steps of introducing a thermally disintegrable or thermally oxidizable exhaust gas produced during manufacturing of semiconductor devices into a processing chamber; heating up this exhaust gas in the processing chamber so that the exhaust gas undergoes thermal disintegration or thermal oxidation and becomes harmless and easy to handle for further processing; capturing fine particles of solid oxides or the like suspended inside the processing chamber with a sweeper provided inside the processing chamber; and sweeping fine particles of solid oxides or the like accumulated on a wall of the processing chamber with the sweeper.

31 Claims, 2 Drawing Sheets

METHOD AND APPARATUS FOR PROCESSING EXHAUST GAS PRODUCED DURING MANUFACTURING OF SEMICONDUCTOR DEVICES

BACKGROUND OF THE INVENTION (1) Field of the Invention

The present invention relates to a method and an apparatus for processing exhaust gas produced during manufacturing semiconductor devices. Particularly, it relates to a method and an apparatus for processing an exhaust gas produced during manufacturing semiconductor devices, in which a thermally disintegrable or thermally oxidizable gas is cost-effectively disintegratable or oxidized into harmless substances so that resulting fine particles and a processed gas can easily be discarded.

(2) Description of the Related Art

These days, the progress of computer technology and electronic control apparatuses making use of this technology is rapidly being made. It seems that no one can predict in which direction the progress is going to be made and how far it goes. Consequently, a progress in manufacturing technology for semiconductor devices, which play an important role as electronic devices within a computer, is also rapidly being made, and its production is rapidly increasing.

Usually, semiconductor materials used for making these semiconductor devices are germanium (Ge) and silicon (Si). Materials such as gallium arsenide (GaAs) and Gallium phosphate are also used in commercial production of devices designed to have special functions.

Production of semiconductor devices usually includes the steps of forming cylindrical body made of semiconductor material, slicing the cylindrical body into semiconductor wafers, forming a number of devices by repeatedly masking, filming, doping, etching, etc., and cutting the wafer into individual devices.

During such production steps, exhaust gases which contain toxic and harmful substances are also produced. In order to prevent environmental pollution, dumping of such exhaust gases without processing is strictly prohibited.

Examples of those materials which are used, or produced, during manufacturing semiconductor devices include those which contain silicon, arsenic, phosphorus, boron, metallic hydrogen, or flon. Halogen, halogenide, nitrogen oxide and others are also among the examples.

Examples of harmful gases which contain silicon are monosilane ($SiH_4$), dichlorosilane ($SiH_2Cl_2$), silicon trichloride ($SiHCl_3$), silicon tetrachloride ($SiCl_4$), silicon tetrafluoride ($SiF_4$), disilane ($SiH_6$), TEOS, etc.

Examples of harmful gases which contain arsenic are arsine ($AsH_3$), arsenic fluoride (III) ($AsF_3$), arsenic fluoride (V) ($AsF_5$), arsenic chloride (III) ($AsCl_3$), arsenic chloride (V) ($AsCl_5$), etc. Examples of harmful gases which contain phosphorus are phosphine ($PH_3$), phosphorus fluoride (III) ($PF_3$), phosphorus fluoride (V) ($PF_5$), phosphorus chloride (III) ($PCl_3$), phosphorus chloride (V) ($PCl_5$), phosphorus oxychloride ($POCl_3$), etc.

Examples of harmful gases which contain boron are diborane ($B_2H_6$), boron trifluoride ($BF_3$), boron trichloride ($BCl_3$), boron tribromide ($BBr_3$), etc., and examples of those which contain metallic hydrogen are hydrogen selenide ($H_2Se$), monogermanium ($GeH_4$), hydrogen telluride ($H_2Te$), stibine ($SbH_3$), tin hydride ($SnH_4$), etc. Examples of harmful gases which contain flon are methane tetrafluoride ($CF_4$), methane trifluoride ($CHF_3$), methane difluoride ($CH_2F_2$), methane hexafluoride, propane hexafluoride ($C_3H_2F_6$), propane octofluoride ($C_3F_8$), etc.

Examples of halogens and halogenides, which are harmful in a gaseous state, usually include fluorine ($F_2$), hydrogen fluoride (HF), chlorine ($Cl_2$), hydrogen chloride (HCl), carbon tetrachloride ($CCl_4$), hydrogen bromide (HBr), nitrogen trifluoride ($NF_3$), sulfur tetrafluoride ($SF_4$), sulfur hexafluoride (SF), tungsten fluoride (VI) ($WF_6$), molybdenum fluoride (VI) ($MoF_6$), germanium tetrachloride ($GeCl_4$), tin tetrachloride ($SnCl_4$), antimony chloride (V) ($SbCl_5$), tungsten chloride (VI) ($WCl_6$), molybdenum hexachloride ($MoCl_6$), etc.

Examples of nitrogen oxides, which are also harmful in a gaseous state, include nitric oxide (NO), nitrogen dioxide ($NO_2$), nitrous oxide ($N_2O$), etc. Examples of other harmful gases include hydrogen sulfide ($H_2S$), ammonia ($NH_3$), trimethylamine (($CH_3)_3N$), etc.

Moreover, it is also known that fine particles are formed in a gas containing ethane ($C_2H_6$) or propane ($C_3H_8$) which are flammable, nitrogen ($N_2$), oxygen ($O_2$), argon (Ar), carbon dioxide ($CO_2$), etc.

These days, public awareness toward prevention of environmental pollution is widely recognized. Therefore, a discharge of exhaust (waste) gases which contain such harmful substances and fine particles are strictly prohibited, and it is required that such waste gases be processed and treated so that they are discharged to an outside environment in a safe and clean condition.

In order to meet such requirements, a so-called exhaust gas processing apparatus which consists of an exhaust duct and a harmful substance processing unit is conventionally employed, where the exhaust duct guides an exhaust gas from the production line of semiconductor devices to the processing unit and the processing unit disintegrates the exhaust gas by a catalyst or adsorbs harmful substances or fine particles thereof by an adsorbent so as to make the exhaust gas harmless. This exhaust gas processing apparatus either chemically processes or physically removes the harmful substances so that the processed gas can be released into the atmosphere.

However, such conventional methods and apparatuses involve complicated processing of the exhaust gas. One method uses an expensive catalyst to disintegrate the gas, and another method uses an expensive adsorbent to treat the gas. Therefore, these catalyst or adsorbent contain or hold harmful substances in one form or another and, therefore, cannot be discarded per se but must be disposed of as industrial wastes. This raises the processing cost.

Furthermore, since the expensive catalysts cannot be used repeatedly and they must be disposed of as industrial wastes, the processing cost further rises.

In order to avoid the above-mentioned disadvantages, it is being considered these days that thermally disintegrable or thermally oxidizable exhaust gases produced during manufacturing of semiconductor devices can be processed by heat so that the exhaust gas becomes harmless. For example, if monosilane (SiH4) is heated in air, it changes to silicon dioxide and water, which are harmless.

Furthermore, if such thermally disintegratable or thermally oxidizable exhaust gases are heat-processed, they change to solids which are harmless and easy-to-handle or to acid gases ($NO_x$ such as NO, $N_2O_3$, or $SO_x$ such as $SO_2$, $SO_3$) which are also easy to handle in further processing because their adsorptivity to water or alkaline water is enhanced so that they can easily be removed.

However, fine particles of solid oxides produced by heat-processing of an exhaust gas and/or fine particles formed during manufacturing of semiconductor devices and already present in the exhaust gas are extremely small in the mean diameter. Therefore, they can barely be removed by methods such as venturi scrubber, scrubber dust collector (wet dust scrubber), cyclone scrubber.

A bag filter and/or an electrostatic precipitator (ESP) are the most effective means for removing such fine particles. However, maintenance of the electrostatic precipitator becomes considerably difficult to perform when the amount of the fine particles are large. Therefore, the electrostatic precipitator is not practical.

Moreover, the bag filter is easily dogged with fine particles, which causes a sudden decrease in pressure and variations in both pressure and air flow. This variation is considerably difficult to control, and prolonged effective dust removal cannot be expected.

SUMMARY OF THE INVENTION

The inventor has found that fine particles of solid oxide which are formed when a thermally disintegratable or thermally oxidizable exhaust gas produced during manufacturing semiconductor devices is heat-processed have the mean diameter of about 0.18 $\mu$m, and that these fine particles accumulate firmly on a wall of the processing chamber as an insulating layer blocking heat transfer.

Therefore, in order to effectively conduct heat from a heater to the processing chamber, it is necessary to remove such an insulating layer which is formed and grown of the fine particles.

The inventor has also found that a sweeper such as a rotating brush is capable of removing the accumulated fine particles both easily and costeffectively because particles which accumulate on the wall of the processing chamber condense and grow into larger particles. The mean diameter of the particles which have condensed and grown into larger particles is several tens of a $\mu$m, which is large enough to descend by their own weight.

The present invention is completed in view of the above-mentioned problems and provides a method and an apparatus for processing an exhaust gas produced during manufacturing of semiconductor devices.

Particularly, it is an object of the present invention that a thermally disintegratable or thermally oxidizable exhaust gas produced during manufacturing semiconductor devices is processed by heat so that the exhaust gas changes to a harmless and/or easy-to-handle solid oxide or to a gas for which further processing can easily be performed.

It is another object of the present invention that the thermal efficiency of the heater is raised by removing an insulating layer which is formed and grown of fine particles of the solid oxide by a sweeper.

It is still another object of the present invention that fine particles accumulated on a wall of the processing chamber can be removed both easily and cost-effectively.

In order to accomplish the above-mentioned objectives, a method for processing an exhaust gas produced during manufacturing semiconductor devices according to the present invention includes the steps of introducing a thermally disintegratable or thermally oxidizable exhaust gas produced during manufacturing of semiconductor devices into a processing chamber, heating up the exhaust gas in the processing chamber so that the exhaust gas undergoes thermal disintegration or thermal oxidation and becomes harmless and easy-to-handle for further processing, capturing fine particles of solid oxides or the like suspended inside the processing chamber with a sweeper provided inside the processing chamber, and sweeping fine particles of solid oxides or the like accumulated on a wall of the processing chamber with the sweeper.

In the method of the present invention, an exhaust gas produced during manufacturing of semiconductor devices is processed by heat in a processing chamber. The method of the present invention is most distinctive in that a sweeper is provided in the processing chamber and fine particles of solid oxides or the like accumulated on the wall of the processing chamber are removed by this sweeper.

Secondly, in order to accomplish the above-mentioned objective, an apparatus for processing an exhaust gas produced during manufacturing of semiconductor devices according to the present invention includes an exhaust gas inlet through which a thermally disintegratable or thermally oxidizable exhaust gas produced during manufacturing of semiconductor devices is introduced, a processing chamber where the exhaust gas undergoes thermal disintegration or thermal oxidation, a processed gas outlet from which a processed gas resulting from the thermal disintegration or the thermal oxidation is discharged, a heater which heats up the exhaust gas in the processing chamber, and a sweeper which is provided in the processing chamber. This sweeper sweeps the wall of the processing chamber and captures fine particles of solid oxides or the like suspended in the processing chamber.

This apparatus of the present invention is used in a case where the exhaust gas produced during manufacturing of semiconductor devices is such that the exhaust gas can be thermally disintegrated or thermally oxidized by simply heating it, thereby changing the exhaust gas to harmless and easy-to-handle solid oxides or processed gases which can easily be processed further.

However, sometimes it is not possible to thermally disintegrate or thermally oxidize the exhaust gas produced during manufacturing semiconductor devices by simply heating it and change the exhaust gas to harmless and easy-to-handle solid oxides or to processed gases which can easily be processed further.

In such a case, it is preferable to mix the exhaust gas with air and/or oxygen gas to obtain an exhaust gas mixture as described below.

That is, another form of the apparatus of the present invention includes an exhaust gas mixture inlet through which an exhaust gas mixture obtained by mixing a thermally disintegratable or thermally oxidizable exhaust gas produced during manufacturing semiconductor devices with air and/or oxygen gas is introduced, a processing chamber where the exhaust gas mixture undergoes thermal disintegration or thermal oxidation, a processed gas outlet from which a processed gas resulting from the thermal disintegration or the thermal oxidation is discharged, a heater which heats the exhaust gas mixture in the processing chamber, and a sweeper provided in the processing chamber. This sweeper sweeps the wall of the processing chamber and captures fine particles of solid oxides or the like suspended inside the processing chamber.

In such a case, it is preferable to have an oxidation promoting gas inlet provided through which air and/or oxygen gas is introduced to the processing chamber or to an exhaust gas flow at a point before it goes into the processing chamber so that the exhaust gas is mixed with the air and/or the oxygen gas.

Other and further objects, features and advantages of the invention will appear more fully from the following description.

DETAILED DESCRIPTION OF THE PREFERRED EMBODIMENT

The method according to the present invention will be described below. In the following description, a term "exhaust gas" is to mean a thermally disintegratable or thermally oxidizable exhaust gas produced during manufacturing semiconductor devices.

In the method of the present invention, an exhaust gas alone may be introduced into the processing chamber to be heated there so that the exhaust gas is thermally disintegrated or thermally oxidized to become harmless and easy-to-handle for further processing. However, when a proportion of oxidizing gas such as air is too small to have thermal disintegration or thermal oxidation, it is preferable to add and mix air and/or oxygen gas, or particularly air, into the exhaust gas to obtain an exhaust gas mixture. Then, this exhaust gas mixture is introduced into the processing chamber for heat-processing.

Accordingly, it is possible to thermally disintegrate or thermally oxidize the exhaust gas with air or oxygen obtained from air which exists in abundance so that the exhaust gas becomes harmless and easy-to-handle for further processing without any help of an expensive catalyst.

In the method of the present invention, the exhaust gas and the air and/or the oxygen gas may be introduced separately into the processing chamber. However, since it is for better processing efficiency to have the exhaust gas and the air and/or the oxygen gas mixed before they enter the processing chamber, it is preferable to have them mixed first to obtain an exhaust gas mixture and then introduce the exhaust gas mixture into the processing chamber.

A mixing ratio of the exhaust gas and the air and/or the oxygen gas, which are introduced into the processing chamber, is not particularly limited to a certain value but will be determined according to a concentration of the exhaust gas to be processed and the amount of oxygen present in the air and/or the oxygen gas. Experimentally, it is confirmed that a preferable amount of harmful substances within the exhaust gas for processing is about 10,000 ppm or less.

Needless to say, even if the amount of harmful substances within the exhaust gas exceeds 10,000 ppm, processing of the exhaust gas which makes it harmless and easy-to-handle for further processing can easily be carried out by simply repeating the process of thermal disintegration or thermal oxidation.

Moreover, in the method of the present invention, when the amount of harmful substances within the exhaust gas exceeds 10,000 ppm, it is preferable to mix the exhaust gas with a large amount of air and/or oxygen gas so that a concentration of the harmful substances within the mixture becomes 10,000 ppm or less.

Furthermore, in the method of the present invention, since the exhaust gas is reacted with air and/or oxygen gas, no limitation is imposed on the amount of exhaust gas to be processed.

Furthermore, in the method according to the present invention, no limitation is imposed on how to introduce the exhaust gas or the exhaust gas mixture into the processing chamber. Hereinafter, it should be understood that the term "exhaust gas mixture" refers to a mixture obtained by mixing an exhaust gas and air and/or oxygen gas. Specifically, the exhaust gas or the exhaust gas mixture is introduced into the processing chamber either by applying pressure on the exhaust gas or the exhaust gas mixture so that it is injected into the processing chamber or by applying negative pressure on the processing chamber so that they are sucked into the processing chamber, or by a combination of these.

In the method of the present invention, a batch-processing may be possible, which includes the steps of introducing into the processing chamber the exhaust gas or the exhaust gas mixture, closing the processing chamber and processing the exhaust gas or the exhaust gas mixture and discharging a processed gas, where these steps are conducted cyclically in the abovedescribed order. However, a continuous processing including the same steps as described above is very advantageous, where these steps are carried out in parallel while each step is carried out continuously, because volume of the processing chamber can be saved and, consequently, the floor area or the space can be saved.

Incidentally, the description of construction of the processing chamber used in the method according to the present invention will be given in the description of an apparatus according to the present invention and is, therefore, omitted here.

In the method of the present invention, the exhaust gas or the exhaust gas mixture, which has been introduced into the processing chamber, is heated either by a heater provided inside of the processing chamber or by a heater provided outside of the processing chamber, or by a combination of these. Incidentally, construction of this heater will be described in a later section where an apparatus according to the present invention is described in detail.

In the method according to the present invention, a temperature at which the exhaust gas or the exhaust gas mixture is heated is not limited to any specific temperature as long as the exhaust gas undergoes thermal disintegration or thermal oxidation to become harmless and easy-to-handle for further processing. Usually, a temperature in the range of from 150° C. and 1,500° C. is preferable.

If the temperature is below 150° C., then efficiency of thermal disintegration or thermal oxidation of the exhaust gas or the exhaust gas mixture drops and it becomes difficult to obtain a processed gas which is harmless and easy-to-handle for further processing. On the other hand, if the temperature exceeds 1,500° C., then the processing capability reaches its limit where a rise in temperature is no longer associated with cost-effectiveness. It is also not preferable because it would be possible for oxygen and nitrogen in air to react to yield harmful nitrogen oxides ($NO_x$). Taking into consideration the processing efficiency as well as costeffectiveness and safety factors, a preferable heating temperature is in the range of from 400° C. and 1,000° C., or more preferably in the range of from 500° C. to 850° C.

In the method of the present invention, it is preferable that the exhaust gas or the exhaust gas mixture be continuously introduced into the processing chamber where the exhaust gas or the exhaust gas mixture is processed continuously and the processed gas is discharged continuously. In such a case, it is preferable to control temperatures at the inlet and the outlet of the processing chamber such that temperature difference between these two locations becomes small.

The reason is that some exhaust gases give off heat and others absorb heat during heat-processing, depending on the properties of the exhaust gases. Therefore, in order to average the heating temperature inside the processing chamber, it is recommended to control the temperature distribution inside the processing chamber in such a way that the temperature discretely or continuously increases along the flow path of the gas from the upstream (the exhaust gas inlet side) to the downstream (the processed gas outlet side), or the other way around.

In the method of the present invention, it is preferable that a catalyst be held by the sweeper as will be described later so that efficiency of thermal disintegration or thermal oxidation of the exhaust gas is enhanced.

In the method of the present invention, anything can be used as the sweeper as long as it can sweep the wall of the processing chamber to remove fine particles of solid oxides or the like accumulated thereon and can capture the fine particles suspended in the processing chamber. Specific examples of the sweeper include a rotating brush, a slab-shaped brush, etc.

In the method of the present invention, the heat-processing of the exhaust gas or the exhaust gas mixture in the processing chamber yields solid oxides such as silicon oxide and gases such as a water vapor. These solid oxides can easily be recovered, and the processed gases such as a water vapor can easily be processed further.

As described above, fine particles of the solid oxides which result from the heat-processing of the thermally disintegrable or thermally oxidizable exhaust gas or fine particles already present in the exhaust gas have the mean diameter of about 0.18 $\mu$m, which is so small that they cannot be collected in conventional dust collecting methods.

Furthermore, these fine particles accumulate firmly on the wall of the processing chamber and form an insulating layer which blocks heat transfer.

Therefore, it is necessary to remove this insulating layer made of fine particles accumulated on the wall of the processing chamber. In the method according to the present invention, this insulating layer can easily be removed by sweeping with the sweeper. Furthermore, due to the heat given to the processing chamber, these fine particles which are disposed on the wall of the processing chamber condense and grow into larger particles whose mean diameter is several tens of a $\mu$m, which is large enough to descend by its own weight. Consequently, these fine particles (the insulating layer) can be removed both easily and cost-effectively.

In other words, the method according to the present invention is most distinctive in that a sweeper is provided in the processing chamber where an exhaust gas or an exhaust gas mixture is heat-processed and fine particles of solid oxide or the like accumulated on the wall of the processing chamber are removed by this sweeper.

This sweeper provided in the processing chamber, which removes the solid oxides accumulated on the wall of the processing chamber, makes it possible to increase the thermal efficiency of the heater and to collect the fine particles both easily and cost-effectively in the conventional dust-collecting methods as described below.

In order to recover fine particles of solid oxides or the like, it is first necessary to isolate such fine particles from the gas which is finished for the heat-processing. Methods for isolating such fine particles from the gas is not limited to any one particular method because these fine particles have condensed and grown into larger particles, and any methods generally known as the vapor-solid separation methods can be used alone or in combination. One method which can be used is to recover the fine particles which descend by their own weight in a recovery tank provided within the processing chamber or at the after stage thereof (sedimentation method). Another method is to make a stream of gas, bend the stream and separate the fine particles by centrifugal separation (cyclone). Examples of other methods includes those incorporating a venturi scrubber, a scrubber or a louver.

The solid oxides which have been separated from the processed gas are left to descend into the recovery tank by their own weight for recovery. Furthermore, the solid oxides are temporarily let to accumulate on the wall of the processing chamber and then swept away by the sweeper so that they are raked or beaten down into the recovery tank.

The simplest method for recovering fine particles of solid oxides or the like is to form a processing chamber inside a vertical tube, provide a recovery tank below the processing chamber, and let the bottom end of the processing chamber be opened toward the recovery tank so that the fine particles descend by their own weight to be recovered in the recovery tank.

As described above, in the method of the present invention, by introducing the exhaust gas or the exhaust gas mixture into the processing chamber where the exhaust gas or the exhaust gas mixture is processed with heat, harmful substances can be thermally disintegrated or thermally oxidized so that the exhaust gas or the exhaust gas mixture becomes harmless in a cost-effective way. It also becomes possible that further processing of the exhaust gas or the exhaust gas mixture, such as adsorption of the processed gas to water or alkaline water, can be carried out both easily and cost-effectively.

Moreover, according to the method of the present invention, expensive catalysts which would disintegrate or adsorb harmful substances need not be used. Instead, the exhaust gas or the exhaust gas mixture can be thermally disintegrated or thermally oxidized, utilizing air or oxygen which can be obtained from air and exists in abundance, so that harmful substances contained in the exhaust gas or the exhaust gas mixture change to solid oxides and a water vapor or acid gases. These solid oxides can easily be separated for recovery, and the acid gases can be adsorbed by water or alkaline water. Therefore, the amount of industrial wastes considerably decreases, and cost for industrial waste management and for environmental protection can be reduced.

Particularly, fine particles which are already present in the exhaust gas or fine particles of solid oxides which result from the heat-processing of the exhaust gas or the exhaust gas mixture are so small that conventional dust collecting methods are not expected to work. In addition, these fine particles firmly accumulate on the wall of the processing chamber as a heat-insulating layer. However, in the method of the present invention, it is possible to easily remove such insulating layer made of these fine particles with the sweeper. Furthermore, since the particles disposed on the wall of the processing chamber condense and grow due to the heat given to the processing chamber so that their mean diameter becomes several tens of a $\mu$m, the fine particles descend by their own weight and the fine particles (the insulating layer) can be removed by a conventional dust collecting method both easily and cost-effectively.

In other words, in the method of the present invention, thermal efficiency of the heater can be improved by removing with the sweeper the fine particles of solid oxides or the like accumulated on the wall of the processing chamber, and the fine particles can be removed both easily and cost-effectively by conventional dust-collecting methods.

Next, an apparatus according to the present invention will be described in detail.

A processing chamber of the apparatus of the present invention only requires that it be constructed in such a way that a thermally disintegrable or thermally oxidizable exhaust gas produced during manufacturing semiconductor devices or a mixture of the exhaust gas and air and/or oxygen gas (referred to simply as the exhaust gas or the like, hereinafter) can be introduced into the processing chamber. Therefore, the processing chamber may be provided with an exhaust gas inlet through which the exhaust gas alone is introduced or an exhaust gas mixture inlet through which the mixture of exhaust gas and air and/or oxygen gas is introduced. It may further be provided with an oxidation promoting gas inlet through which air and/or oxygen gas is introduced.

The above-mentioned exhaust gas inlet, gas mixture inlet and oxidation promoting gas inlet can also be used as a processed gas outlet through which a processed gas is discharged from the processing chamber. However, if the processed gas outlet is provided separately from those inlets, then a certain stream of gas can be established inside the processing chamber so that continuous processing of the exhaust gas or the like can be carried out. This is advantageous over batch-processing because it shortens an overall processing time and also allows one to have the processing chamber of smaller size. Needless to say, it is still possible to carry out batch-processing even when the processed gas outlet is provided separately from the exhaust gas inlet, the gas mixture inlet and/or the oxidation promoting gas inlet.

The apparatus of the present invention, which processes the exhaust gas or the like in the processing chamber, is most distinctive in that a sweeper which is provided in the processing chamber removes fine particles of solid oxides or the like accumulated on the wall of the processing chamber and captures the fine particles suspended in the processing chamber.

Because of the construction of the apparatus of the present invention, an insulating layer of fine particles accumulated on the wall of the processing chamber can easily be removed by the sweeper. Furthermore, since fine particles disposed on the wall of the processing chamber condense and grow such that their mean diameter becomes several tens of a $\mu$m, the fine particles descend by their own weight. This makes it possible to remove the fine particles (the insulating layer) by a conventional dust-collecting method both easily and cost-effectively.

In order to recover the fine particles of solid oxides or the like, it is first necessary to isolate those fine particles from the gas which is finished for the heat-processing. Methods for isolating such fine particles from the exhaust gas or the like is not limited to any one particular method because these fine particles have condensed and grown into larger particles, and any methods generally known as the vapor-solid separation methods can be used alone or in combination. One method which can be used is to recover the fine particles which descend by their own weight in a recovery tank provided within the processing chamber or at the after stage thereof (sedimentation method). Another method is to make a stream of gas, bend the stream and separate the fine particles by centrifugal separation (cyclone). Examples of other methods includes those incorporating a venturi scrubber, a scrubber or a louver.

In the apparatus of the present invention, the processing chamber is formed inside a straight pipe which stands vertical or is inclined from the vertical, and the sweeper is provided in the straight pipe in such a way that it is rotatable around a center axis of the straight pipe. A means for rotating the sweeper is also provided. Therefore, when it is expected that fine particles of solid oxides or the like accumulate on the wall of the processing chamber, which would lower the thermal conductivity and the thermal efficiency, the above-mentioned sweeper is rotated so that the fine particles are swept off and let to descend by their own weight In the apparatus of the present invention, it is possible that the sweeper is formed such that its length is shorter than the length of the pipe and that this sweeper moves up and down between the top and bottom ends of the pipe so that it sweeps off fine particles of solid oxides or the like accumulated on the wall of the processing chamber in a downward or obliquely-downward direction.

In such a case, it is possible that the sweeper is moved up and down while it is rotated around its center axis, thereby removing the fine particles of solid oxides or the like accumulated on the wall of the processing chamber. Similarly, it is also possible that the sweeper is simply moved up and down without any rotation, thereby removing the fine particles of solid oxides or the like accumulated on the wall of the processing chamber.

When continuous processing is intended in the apparatus of the present invention, it is preferable to have as long a path of gas flow as possible between where the exhaust gas or the like enters the processing chamber and where it is discharged therefrom. Specifically, the former is the exhaust gas inlet, the exhaust gas mixture inlet or the oxidation promoting gas inlet, and the latter is the processed gas outlet. This makes the exhaust gas or the like remain in the processing chamber as long as possible, thereby increasing the processing efficiency.

Therefore, when continuous processing is intended, if a curved path of gas flow is formed within the processing chamber, then the effective length of the flow path of the exhaust gas or the like in the processing chamber becomes long, and the solid oxides are efficiently isolated from the gas flow by centrifugal force due to the curved flow path.

In a case where a spiral flow path is to be formed within the processing chamber, the apparatus of the present invention can be constructed as follows. That is, the processing chamber is formed inside a pipe. The sweeper has a spiral shape so that it forms a spiral path for a gas flow inside the pipe. The spiral-shaped sweeper is provided in such a way that it is rotatable around a center axis of the pipe, and a means for rotating the spiral-shaped sweeper is provided. Then, by rotating the spiral-shaped sweeper by the rotating means, fine particles of solid oxides or the like accumulated on the wall of the processing chamber can be removed. Furthermore, since these fine particles are raked to one end of the spiral-shaped sweeper, the fine particles of solid oxides or the like can be recovered more easily.

In the apparatus of the present invention, in order to recover fine particles of solid oxides or the like both easily and efficiently as well as to simplify the structure, it is preferable that the processing chamber be formed inside a straight pipe which stands vertical or is inclined from the vertical and that the spiral-shaped sweeper be rotated in such a way that it sweeps off fine particles of solid oxides or the like accumulated on the wall of the processing chamber in a downward direction or a obliquely-downward direction.

In the apparatus of the present invention, no limitation is imposed on the type of sweeper as long as it can sweep off fine particles of solid oxides or the like accumulated on the wall of the processing chamber. Specific examples include a rotating brush, a slab-shaped brush, a spiral-shaped brush, etc. Particularly preferable among these is the rotating brush.

In the apparatus of the present invention, it is preferable that a recovery tank be provided below the processing chamber and that the bottom of the processing chamber be opened toward the recovery tank. This way, fine particles of solid oxides or the like can be recovered in the recovery tank, and the recovered fine particles can be carried in this recovery tank to other locations.

In the apparatus of the present invention, it is necessary that the sweeper be made of heat-resistive material which can maintain physical integrity under the heat required for the heat-processing, examples of which are metals including iron, steel such as stainless steel, copper, aluminum, alloys such as cermet, quartz, ceramics such as alumina. It is preferable to select a brush a material which is less resistive to wear than the wall of the processing chamber in order to reduce friction with the chamber wall, thereby saving running costs. For example, in a case where the wall of the processing chamber is made of ceramic materials, it is preferable to use stainless steel, cermet, etc. From cost-oriented consideration, it is preferable to use stainless steel.

In the apparatus of the present invention, in order to have thermal disintegration or thermal oxidation in an efficient way, it is preferable that a catalyst be held by the sweeper.

Such a catalyst is not limited to any one particular substance. Examples include silica, chromium oxide, alumina, bentonite, activated kaolin, iron oxide, copper oxide, copper suboxide, tin oxide, vanadium pentoxide, vanadium trioxide, catalysts containing manganese such as manganese dioxide, iron, copper, cobalt, nickel, nickel oxide, molybdenum oxide, molybdenum, aluminum phosphate, tungsten trioxide, catalysts containing iron oxide, catalysts containing copper oxide, $SiO_2$—$Al_2O_3$, $SiO_2$—$MgO$, $Cu_2Cr_2O_4$, $ZnO$—$Cr_2O_3$—$(CuO)$, $TiO_2$—$P_2O_5$, $MoO_3$—$CoO$, $MoO_3$—$Bi_2O_3$—$P_2O_5$, platinum, palladium, and precious metals such as platinum-palladium.

Needless to say, in the apparatus of the present invention, it is necessary that the wall of the processing chamber neither be deformed nor damaged when the exhaust gas or the like which is introduced into the chamber is heated. Therefore, it is necessary that materials for the chamber be those which have heat-resistivity, and examples of such materials are metals including iron, steel such as stainless steel, copper, aluminum, alloys such as cermet, quartz, ceramics such as alumina. Preferable among these materials are ceramics which are chemically stable under high temperature. In particular, alumina is preferable because of its low price.

In the apparatus of the present invention, an exhaust gas and air and/or oxygen gas may simultaneously be introduced into the processing chamber such that they are not mixed before they enter the processing chamber but will be so in the chamber. It may also be possible to introduce the exhaust gas into the chamber first and then the air and/or the oxygen gas, or vice versa. In such a case, a processing chamber which has the exhaust gas inlet for introducing the exhaust gas and the oxidation promoting gas inlet for introducing the air and/or the oxygen gas is used.

In a case where an exhaust gas mixture which is obtained by mixing the exhaust gas and the air and/or the oxygen gas is introduced into the processing chamber, the processing chamber which has an exhaust gas mixture inlet for introducing the exhaust gas mixture is used. A means for mixing the exhaust gas and the air and/or oxygen gas, which is connected to the exhaust gas mixture inlet, is also provided.

In a case where air is with be mixed to the exhaust gas, the mixing means includes, for example, an air pump which pressurizes and discharges air and an ejector which ejects the exhaust gas into the flow of pressurized air discharged from the air pump. The exhaust gas is sucked into the flow of air due to static pressure.

Another example of the mixing means used in the apparatus of the present invention has the same structure as the above example except that the exhaust gas is ejected into the flow of air which is being inhaled into the air pump, where the exhaust gas is also sucked into the flow of air due to static pressure, thereby mixing the exhaust gas and the air together.

Examples of the air pump include a reciprocating air pump, a rotary air pump, a centrifugal air pump, a roots blower, and a gear pump with outer or inner gears. A so-called jet pump which incorporates ejectors can also be used.

If the apparatus of the present invention uses the above-mentioned mixing means including the air pump and the ejector, then it may be possible that the exhaust gas leaks to the surroundings through the ejector and the air pump when the air pump is turned off. This can be properly avoided by providing a check valve or an open-close valve in a pressurized air discharging duct from the air pump or in an air intake duct to the air pump at a point upstream of where the exhaust gas merges with the air flow. The check valve or the open-close valve can also be provided in an exhaust gas introduction duct through which the exhaust gas is introduced into the ejector.

Still another example of the mixing means is that which includes an air pump and a coupling. The air pump pressurizes and discharges air, and the coupling combines the pressurized air discharged from the air pump and the exhaust gas which is also pressurized to almost the same pressure as the air. The combines flow of gas is then directed to the processing chamber.

It may also be possible in this case that the exhaust gas leaks through the air pump which is turned off. Therefore, it is preferable that a check valve or an open-close valve be provided in a pressurized air discharging duct from the air pump or in an air intake duct to the air pump at a point upstream of where the exhaust gas combines with the air flow. The check valve or the open-close valve can also be provided in an exhaust gas introduction duct through which the exhaust gas is introduced into the coupling.

In the apparatus of the present invention, no limitation is imposed on the number of processing chambers. Accordingly, a plurality of processing chambers may be provided, where they can be connected either in parallel or in series to an exhaust gas source.

In a case where a plurality of processing chambers are provided, it is preferable to increase oxygen concentration in the exhaust gas or the like to be processed so that the thermal disintegration or oxidation of the exhaust gas or intermediate products thereof will be promoted. This can be accomplished by providing a means for supplementing air, which directly sends air necessary for processing to one or more of the processing chambers at the second stage and beyond or to a duct connecting any two neighboring chambers.

In the apparatus of the present invention, heaters may be provided around the processing chamber or inside the processing chamber. They may also be provided both around and inside the processing chamber.

The heaters may be those which generate heat by themselves such as electric heaters, burners of flammable gas or oil, etc. or those which provide heat through circulation of a thermal medium heated by a heat source.

Preferable among those heaters are the electric heaters because of their fast start-up characteristics and their easy control of temperature.

No limitation is imposed on the type of the electric heaters as long as they are electrically energized. Examples of the heaters include a resister heater, an infrared lamp, a quartz heater, etc.

Examples of those which serve as the above-mentioned burner include those which burn gaseous fuel such as petrolic gas or natural gas, liquid fuel such as petroleum, or solid fuel.

Since the exhaust gas or the like is usually at a temperature lower than the above-mentioned processing temperature (150° C. to 1,500° C.) when introduced into the processing chamber, there will be a difference between the temperature of the exhaust gas or the like and the processing temperature at locations of the exhaust gas inlet, the oxidation promoting gas inlet or the exhaust gas mixture inlet, or proximate areas thereto. This temperature difference creates a stress force over the inside and outside of the processing chamber, or of the heater due to a difference in thermal expansion. This may cause a fissure in the chamber wall or the heater, through which the exhaust gas leaks to an outside area.

In order to resolve this situation, it is preferable that the heaters can realize temperature distribution which varies either discretely or continuously in such a way that the temperature is low to the inlet side of the chamber where the exhaust gas or the like enters and the temperature is high to the outlet side where the processed gas is discharged.

In a case where electric heaters consisting of resisters are used, such a temperature distribution can be realized by sparsely distributing resisters or having resistance of the resisters decreased around the exhaust gas inlet, the oxidation promoting gas inlet or the exhaust gas mixture inlet. This varies the temperature distribution over the processing chamber either discretely or continuously in such a way that the temperatures are low to the inlet side of the chamber and high to the outlet side.

In a case where burners are used as the heaters, such a temperature distribution can be realized by arranging nozzles of the burners in such a way that they are placed sparsely to the inlet side of the exhaust gas or the like or the oxidation promoting gas and densely to the outlet side of the processed gas. This varies the temperature distribution over the processing chamber either discretely or continuously in such a way that the temperatures are low to the exhaust gas inlet side and high to the processed gas outlet side.

Furthermore, in a case where the circulation of a thermal medium is used, the thermal medium is led to the processed gas outlet side first and then to the inlet side of the exhaust gas or the like. Or, the circulation of the thermal medium is provided in such a way that circulatory routes are disposed densely to the outlet side of the processed gas and sparsely to the inlet side of the exhaust gas or the like. This varies the temperature distribution over the processing chamber either discretely or continuously in such a way that the temperatures are low to the exhaust gas inlet side and high to the processed gas outlet side.

However, if the processing temperatures are varied either discretely or continuously such that the temperature is low to the exhaust gas inlet side and high to the processed gas outlet side, then processing efficiency may decrease.

Hence, if there is no danger of developing a fissure on the surface of heaters or in the chamber wall due to a difference in thermal expansion rate, then the heaters may be arranged in a fashion which is exactly the opposite to those described above, that is, the temperatures are varied either discretely or continuously such that the temperature is high to the exhaust gas inlet side of the chamber and low to the processed gas outlet side.

In the apparatus of the present invention, it is preferable that the temperature of the heaters be controlled in such a way that the processing temperature does not become too low or too high, thereby preventing a decrease in the exhaust gas processing efficiency, saving energy and preventing thermal degradation of the processing chamber due to excessive heating.

In the apparatus of the present invention, air and/or oxygen gas which is heated by a heating device may be introduced into the processing chamber for the exhaust gas processing to be carried out quickly.

In such a case, the air and/or oxygen gas is heated before it is introduced into the processing chamber. Examples of the heating device include those which were described above for the heaters.

Another form of the heating device is a heat exchanger which provides an exchange of heat between air and/or oxygen gas and the processed gas at high temperature. Or, the exhaust gas may be heated for processing by a part of the processed gas at a high temperature which is put to circulation and the air and/or oxygen gas which is heated.

In the apparatus of the present invention, the exhaust gas is heated to the processing temperature of about 150° C. to about 1,500° C. by the heated air and/or oxygen.

Furthermore, in the apparatus of the present invention, it is preferable that the temperature of the heating device be controlled so that the heating temperature does not become too low or too high, thereby preventing a decrease in the exhaust gas processing efficiency, saving energy and preventing thermal degradation of the processing chamber wall due to excessive heating.

The present apparatus includes an exhaust gas inlet through which an exhaust gas produced during manufacturing semiconductor devices is introduced, a processing chamber where the exhaust gas undergoes thermal disintegration or thermal oxidation, a processed gas outlet from which a processed gas resulting from the thermal disintegration or the thermal oxidation is discharged, a heater which heats up the exhaust gas in the processing chamber, and a sweeper which is provided in the processing chamber so as to sweep a wall of the processing chamber and capture fine particles of solid oxides or the like suspended inside the processing chamber. Therefore, the method of the present invention can surely be performed, and the processing of the exhaust gas can be performed safely and reliably as well as cost-effectively.

Another form of the present apparatus includes a gas mixture inlet through which an exhaust gas mixture obtained by mixing a thermally disintegrable or thermally oxidizable exhaust gas produced during manufacturing of semiconductor devices and air and/or oxygen gas is introduced, a processing chamber where the exhaust gas mixture undergoes thermal disintegration or thermal oxidation, a processed gas outlet from which a processed gas resulting from the thermal disintegration or thermal oxidation is discharged, a heater which heats up the exhaust gas mixture in the processing chamber, and a sweeper which is provided in the processing chamber so as to sweep a wall of the processing chamber and capture fine particles of solid oxides or the like suspended in the processing chamber. Therefore, the exhaust gas can securely be processed for thermal disintegration or thermal oxidation, and the processing of the exhaust gas can be performed safely and reliably as well as cost-effectively.

In such a case, if an oxidation promoting gas inlet is provided through which air and/or oxygen gas is introduced to the processing chamber or to an exhaust gas flow at a point before it goes into the processing chamber so that the exhaust gas is mixed with the air and/or the oxygen gas, the exhaust gas processing can be carried out both easily and more securely.

In the apparatus of the present invention, the processing chamber is formed inside a straight pipe which stands vertical or is inclined from the vertical, and the sweeper is provided in the straight pipe in such a way that it is rotatable around a center axis of the straight pipe. A means for rotating the sweeper is also provided. Therefore, fine particles of solid oxides accumulated on the chamber wall can be removed by the sweeper. This prevents the degradation of thermal conductivity and constantly maintains high thermal efficiency.

If, in the apparatus of the present invention, the processing chamber is formed inside a pipe, the sweeper has a spiral shape so that it forms a spiral path for a gas flow inside the pipe, the spiral-shaped sweeper is provided in such a way that it is rotatable around a center axis of the pipe, and a means for rotating the spiral-shaped sweeper is further provided, then solid oxides accumulated on the surface of the processing chamber is cleaned by having the distal part of the spiral-shaped sweeper sweep the inner surface of the chamber, raking together the solid oxides into one end of the chamber. This facilitates the recovery of fine particles of solid oxides or the like. Particularly, when heaters are arranged around the processing chamber, the thermal conductivity decreased because of the accumulated particles of solid oxides can be restored, thereby preventing a decrease of process efficiency for longer period of time.

If, in the apparatus of the present invention, the processing chamber is formed in a straight pipe which stands vertical or is inclined from the vertical, the spiral-shaped sweeper is rotated in such a way that it sweeps off fine particles of solid oxides or the like accumulated on a chamber wall in a downward direction or a obliquely-downward direction, then the fine particles of solid oxides condensed and grown in the processing chamber move downwardly by their own weight. This not only facilitates the recovery of fine particles but it also restores a thermal conductivity decreased because of the accumulated solid oxides on the chamber wall, thereby preventing a decrease of process efficiency for a longer period of time.

Furthermore, if the sweeper is made of a center axis and brush hairs spirally provided around this center axis, then by rotating this spiral brush, it prevents solid oxides from accumulating between the spiral brush and the chamber wall, which would otherwise increase rotational friction of the spiral brush. Moreover, since the spiral brush itself vibrates during rotation and brushes off the solid oxides which was caught by the spiral brush, recovery of solid oxides from the spiral brush can be facilitated.

If a recovery tank is provided below the processing chamber and the bottom of the processing chamber is opened toward this recovery tank, then solid oxides can be collected in the recovery tank and be discarded. This prevents a decrease in volume of the processing chamber due to accumulation of solid oxides, thereby maintaining a prescribed processing ability for a longer period of time.

If a catalyst is held by the sweeper, then thermal disintegration or thermal oxidation of the exhaust gas is further enhanced, and, therefore, the exhaust gas is disintegrated or oxidized at lower temperatures.

If the apparatus of the present invention is such that a means for mixing the exhaust gas with air and/or oxygen gas is provided and a mixture of the exhaust gas and the air and/or oxygen gas obtained by the mixing means is introduced into the processing chamber, then a mixture ratio of the exhaust gas and the air and/or oxygen can easily be controlled so that the processing of the exhaust gas is securely performed.

In a case where the exhaust gas is to be mixed with air, if the mixing means includes an air pump which inhales, pressurizes and discharges air and an ejector which ejects the exhaust gas to the air discharged from the air pump, utilizing static pressure of the air, thereby mixing them together, then a portion of the exhaust gas remaining at the source can be sucked in for processing. This prevents the exhaust gas remaining at the source from leaking to the surroundings.

If, in the apparatus of the present invention, the mixing means includes an air pump which inhales air and an ejector which ejects the exhaust gas to the air inhaled by the air pump, utilizing static pressure of the air, thereby mixing them together, then a portion of exhaust gas remaining at the source can be sucked in for processing. This prevents the exhaust gas remaining at the source from leaking to the surroundings.

In these cases, if the apparatus of the present invention includes a check valve or an open-close valve which is provided either in a pressurized air discharging duct from the air pump or an air intake duct to the air pump or in an exhaust gas introduction duct through which the exhaust gas is introduced into the ejector, then, when the air pump is not running, it can prevent the exhaust gas from leaking to the surroundings, which would otherwise do so through the air pump.

If a mixing means is to be provided and this mixing means includes an air pump which inhales, pressurizes and discharges air and a coupling which merges pressurized air discharged from the air pump and the pressurized exhaust gas and directs them to the processing chamber, then the pressure inside the processing chamber can be increased and a contact rate of the exhaust gas and the air inside the chamber can be increased, thereby increasing the processing capability.

If, in the above case, the apparatus of the present invention further includes a check valve or an open-close valve provided either in a pressurized air discharging duct from the air pump or an air intake duct to the air pump or in an exhaust gas introduction duct through which the exhaust gas is introduced into the coupling, then leakage of the exhaust gas through the air pump which is not running can securely be prevented and the safety of operation can be assured.

If, in the apparatus of the present invention, a plurality of processing chambers are provided, then even a highly concentrated exhaust gas can be processed over several stages. In such a case, if a means for supplementing air to one or more of the processing chambers at the second stage and beyond is provided, then the amount of oxygen which comes into contact with the exhaust gas after the second stage can be increased, thereby enhancing further a processing efficiency.

If, in the apparatus of the present invention, heaters are provided around the processing chamber, then the gas flow inside the chamber is not obstructed by the heaters. Local piling of solid oxides due to stagnation of the gas inside the chamber is also prevented.

If, in the apparatus of the present invention, the heaters are provided inside the processing chamber, then there is no waste of heat generated by the heaters, which is absorbed by the gas surrounding the heater. Therefore, temperature inside the chamber rises to the process temperature in a short period of time, and the effective processing time becomes long, thereby further increasing processing efficiency.

If, in the apparatus of the present invention, a plurality of heaters are provided both around and inside the processing chamber, then heat is effectively generated, and the temperature inside the chamber rises to the processing temperature more rapidly, thereby practically prolonging the processing time and increasing and processing efficiency at each stage.

In the apparatus of the present invention, temperature of the heaters is controlled in such a way that it is neither too cold nor too hot. This prevents a decrease in efficiency of processing the exhaust gas. It also saves energy and prevents thermal degradation of the processing chamber at an early stage due to excessive heating.

Furthermore, if the apparatus of the present invention includes an exhaust gas inlet through which an exhaust gas is introduced, a processing chamber where the exhaust gas undergoes thermal disintegration or thermal oxidation, a processed gas outlet from which a processed gas resulting from the thermal disintegration or the thermal oxidation is discharged, and heaters for air and/or oxygen gas, where the air and/or the oxygen heated by the heaters is introduced into the processing chamber, thereby heating the exhaust gas, then processing of the exhaust gas can be performed safely and securely as well as cost-effectively.

In the apparatus of the present invention, temperature of the heater is controlled in such a way that it is neither too cold nor too hot. This prevents a decrease in efficiency of exhaust gas processing. It also saves energy and prevents thermal degradation of the processing chamber at an early stage due to excessive heating.

EXAMPLE 1

Hereinafter, examples of the method and apparatus for processing an exhaust gas produced during manufacturing of semiconductor devices according to the present invention will be described with reference to FIGS. 1 and 2. In the examples, monosilane ($SiH_4$) is used as a harmful substance to be removed. It should be understood that the present invention is not limited to these examples described here.

Figure 1:
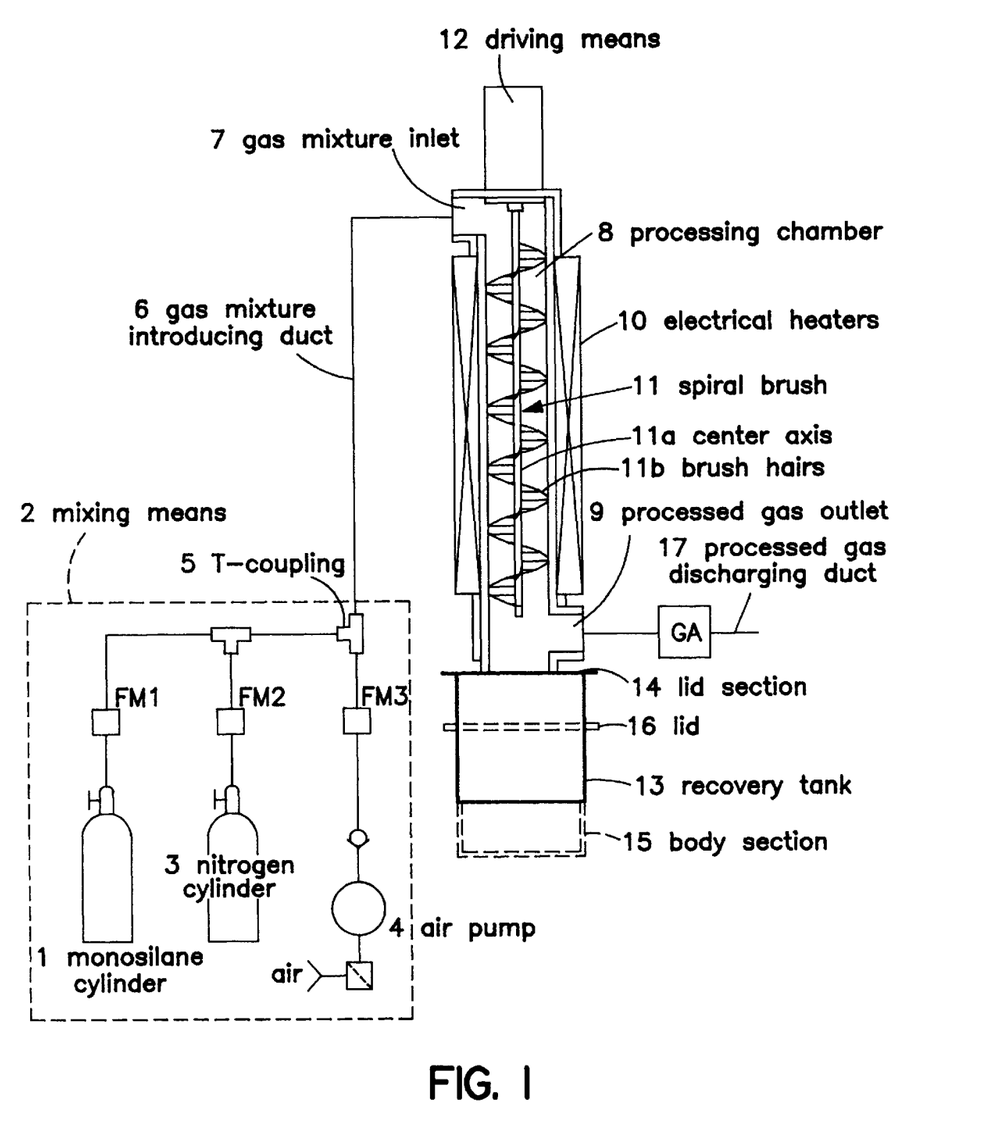
FIG. 1 is a schematic view of one example of an apparatus according to the present invention.

FIG. 1 is a schematic view of an apparatus according to a first example of the present invention. Reference numeral 2 designates a mixing means where air and 20% monosilane in nitrogen supplied by a cylinder 1 are mixed together. The 20% monosilane may further be mixed with nitrogen supplied by a cylinder 3 before being mixed with air, when necessary. The mixing means 2 is adjusted such that it supplies a gas mixture which contains about 1,000 ppm of monosilane.

The mixing means 2 further includes an air pump 4 (manufactured by Iwaki; model number: AP-450D-S) and a T-coupling 5. The T-coupling 5 merges the air discharged from the air pump 4, the nitrogen gas supplied by the nitrogen cylinder 3 and the 20% monosilane gas supplied by the cylinder 1, and directs the gas mixture to a processing chamber 8.

The processing chamber 8 is a ceramic cylinder or a straight ceramic tube made of alumina, whose dimensions are 24 mm of inner diameter, 30 mm of outer diameter and 600 mm of height (or length). The processing chamber 8 has at the top end a gas mixture introducing duct 6 which is guided from the T-coupling 5 and a gas mixture inlet 7 to which the introducing duct 6 is connected. The processing chamber 8 is set such that its axis stands vertical. The chamber 8 also has near the bottom end a processed gas outlet 9 from which a processed gas resulting from heat-processing of the gas mixture containing monosilane in the processing chamber 8 is discharged.

The processing chamber 8 is provided with electrical heaters 10 which surround the chamber almost along its entire length. The processing chamber 8 has a spiral brush 11 which is provided inside the chamber and can rotate about the center axis. As a driving means 12 for rotating the spiral brush 11, a motor is provided on top of the processing chamber 8.

The spiral brush 11 consists of a center axis 11a which is set along the center axis of the processing chamber 8 and brush hairs 11b which are planted in a spiral manner in the center axis 11a. The distal end of the brush hairs 11b makes contact with the wall of the processing chamber 8, and the brush hairs 11b themselves define a spiral flow path inside the processing chamber 8.

Furthermore, a recovery tank 13 is provided below the processing chamber 8, and the entire bottom end of the processing chamber 8 is opened to the recovery tank 13.

The recovery tank 13 includes a lid section 14 which is connected to the bottom of the processing chamber 8 so as to form a flange, a body section 15 which is detachably connected to the underside of lid section 14 and a lid 16 which is placed to cover the opening of the body section 15 during transportation.

In FIG. 1, FM1, FM2 and FM3 stand for flow meters, and GA stands for a gas analyzer whose detection threshold for monosilane is 0.16 ppm). Reference numeral 17 designates a processed gas discharging duct.

The 20% monosilane cylinder 1 supplied 20% monosilane gas at a rate of 84 ml/min. The nitrogen cylinder 3 supplied nitrogen gas at a rate of 0.4l/min, and the air pump 4 supplied air at a rate of 16l/min. These gases were mixed together, and a gas mixture so obtained was introduced into the processing chamber 8. The gas mixture was heated for processing to 600° C. by the heaters 10. Then, the gas mixture which was done with processing (a processed gas) and discharged from a processed gas outlet 9 was sampled for analysis. The analysis revealed that no monosilane was detected in sample of the processed gas, thereby confirming that the processing apparatus of the present invention yielded better results than conventional processing apparatus utilizing catalysts in terms of processing efficiency.

Recovered in the recovery tank 13 was a considerably amount of fine powder of silicon oxide which was dry and of high purity.

Such fine powder of silicon oxide was obtained as follows. Monosilane is an inherently highly reductive gas. While the monosilane flows along the spiral path formed inside the processing chamber 8 by the spiral brush 11, it is oxidized through a contact with oxygen under high temperature and is thermally disintegrated into water vapor and silicon oxide. This silicon oxide is extremely minute and accumulates on the wall of the processing chamber 8, and would cause a decrease of the thermal efficiency if it stays on the chamber wall. However, the silicon oxide is removed by the rotating spiral brush 11, and the silicon oxide which came off of the chamber wall descends along the spiral path formed by the spiral brush 11 to be recovered by the recovery tank 13.

The above-mentioned gas mixture was continuously heat-processed for 10 days and, then, the driving means 12 was engaged and the spiral brush 11 was rotated in such a direction that it raked downward the silicon oxide accumulated on the wall of the processing chamber 8. The silicon oxide which was accumulated on the chamber wall was removed, and the silicon oxide which was deposited on the brush hairs of spiral brush 11 was beaten off. The silicon oxide was further conveyed downward to be recovered in the recovery tank 13.

Since, as described above, the recovery tank 13 had the lid section 14 which was connected to the bottom of the processing chamber 8 so as to form a flange and the body section 15 which was detachably connected to the underside of lid section 14, the silicon oxide which was descending from the processing chamber 8 toward the recovery tank 13 did not disperse into the surroundings, thereby maintaining a considerably clean working environment.

Furthermore, when transporting the silicon oxide recovered in the recovery tank 13, the body section 15 was detached from the lid section 14, and then the upper side of the body section 15 was closed with the lid 16. This securely prevented fine powder of silicon oxide from dispersing to the surroundings during transportation.

Although, in this example, the spiral brush 11 was rotated after 10 days of continuous processing of the gas mixture, it may be possible to rotate the spiral brush 11 when the processing is being performed.

EXAMPLE 2

Figure 2:
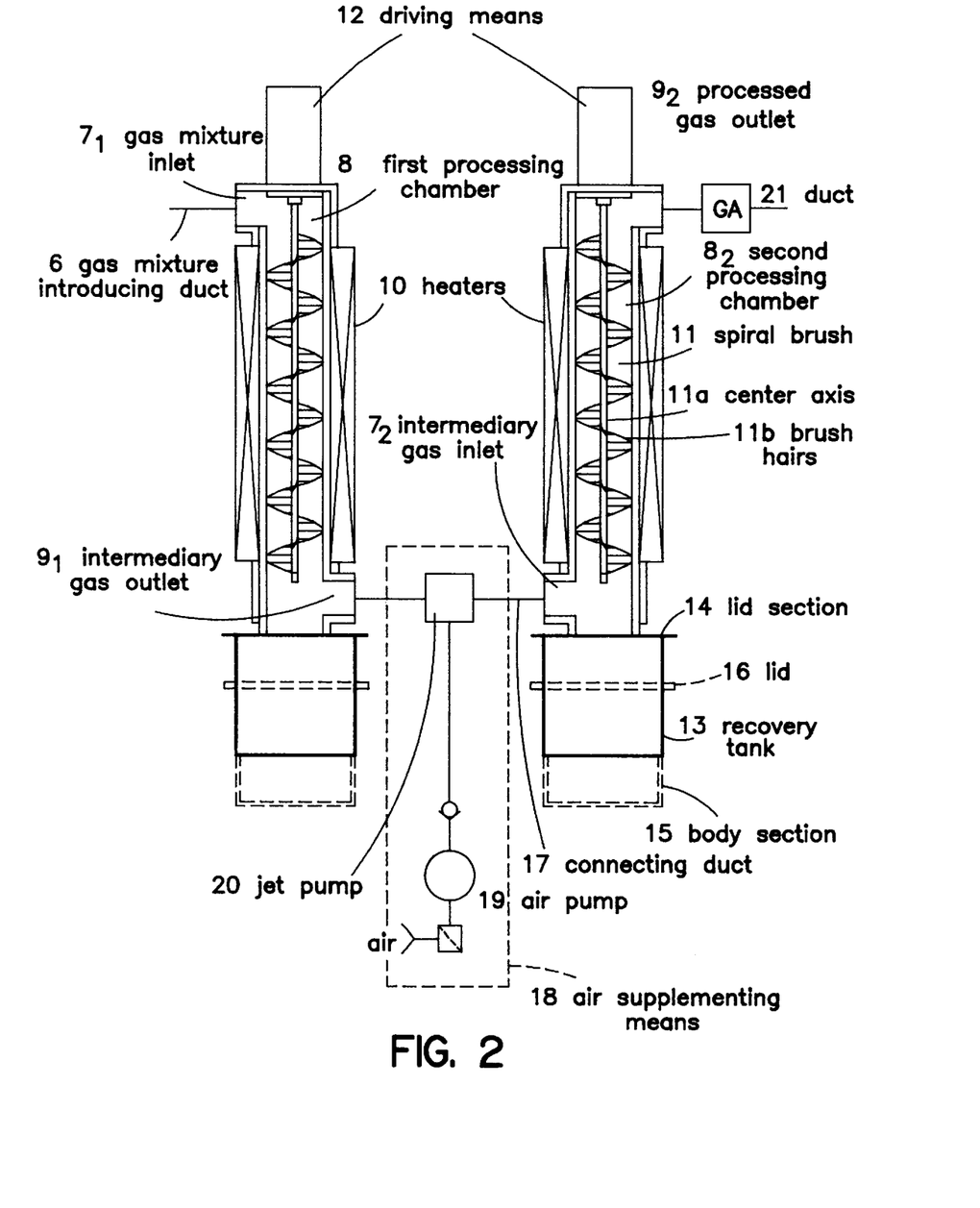
FIG. 2 is a schematic view of another example of an apparatus according to the present invention.

FIG. 2 is a schematic view of an apparatus according to a second example of the present invention. In the second example, two processing chambers, namely a first processing chamber $8_1$ and a second processing chamber $8_2$, are provided where the structure of each is the same as the processing chamber in the first example. Each processing chamber is provided with a spiral brush 11 and a driving means 12 for rotating the spiral brush 11. A recovery tank 13 is also provided under each processing chamber.

A gas mixture is led to a gas mixture inlet $7_1$ provided around the top end of the first processing chamber $8_1$, and then led to an intermediary gas inlet $7_2$ provided around the bottom end of the second processing chamber $8_2$ from an intermediary gas outlet $9_1$ through a connecting duct 17. The processed gas is discharged from a processed gas outlet $9_2$ provided around the top end of the second processing chamber $8_2$ to the atmosphere.

As shown in FIG. 2, by connecting the bottom ends of the first processing chamber $8_1$ and the second processing chamber $8_2$ with the connecting duct 17, a path from the first processing chamber $8_1$ to the second processing chamber $8_2$ can be shortened. This minimizes a decrease in temperature of the gas mixture while being transported from the first processing chamber $8_1$ to the second processing chamber $8_2$, thereby lightening the load of heaters 10 of the second processing chamber $8_2$, and realizes more effective processing.

In this example, a means for supplementing air 18 is provided at an intermediate point of the connecting duct 17 between the intermediary gas outlet $9_1$ of the first processing chamber $8_1$ and the intermediary gas inlet $7_2$ of the second processing chamber $8_2$, so that the air supply in the second processing chamber $8_2$ is supplemented with additional air. The air supplementing means 18 includes an air pump 19 and a jet pump 20 which is driven by pressurized air discharged from the air pump 19 to pressurize the intermediary gas and accelerate its flow in the connecting duct 17. The jet pump 20 increases the amount of air in the intermediary gas so that a sufficient amount of air is present in the second processing chamber $8_2$ for further processing. This maintains concentration of oxygen in the intermediary gas high enough for thermal disintegration to proceed, and harmful substances which still remain in the gas mixture, including those which are in an intermediary form, are promptly disintegrated.

In this example, although it is not shown in FIG. 2, an open-close valve and a bypass may be provided. The open-close valve is to be provided in the connecting duct 17 between the intermediary gas outlet $9_1$ of the first processing chamber $8_1$ and the jet pump 20 of the air supplementing means 18, and the bypass is to begin at this open-close valve, branching from the connecting duct 17, and to end at a duct 21 on the other side of the second processing chamber $8_2$. This makes it possible to divert the gas mixture into the atmosphere through the bypass and the duct 21 if the gas mixture contains no more harmful substances after the processing in the first processing chamber $8_1$.

Since other structures, functions, effects, etc. are the same as those of the first example, description of those will be omitted here to avoid overlaps.

In the present invention, it is not required to vertically position the processing chamber although it is done so both in the first and second examples. It may as well be possible to position the processing chamber horizontally or obliquely.

Furthermore, in the present invention, it is not required that the center axis of the processing chamber be a straight line. It may as well be possible that the processing chamber be formed as a spiral tube.

Furthermore, in the present invention, it is not required that cross-sections of the processing chamber which are taken parallel to one another be uniform in size. It may as well be possible that the processing chamber be formed in such a way that cross-sections which are taken parallel to one another become smaller from one end to another or vice versa.

As many apparently widely different embodiments of this invention may be made without departing from the spirit and scope thereof, it is to be understood that the invention is not limited to the specific embodiments thereof except as defined in the appended claims.

What is claimed is:

1. A method for processing an exhaust gas produced during manufacturing of semiconductor devices comprising the steps of:

introducing a thermally disintegratable or thermally oxidizable exhaust gas produced during manufacturing of semiconductor devices into a processing chamber;

heating said exhaust gas in the processing chamber so that the exhaust gas undergoes thermal disintegration or thermal oxidation and becomes harmless and easy to handle for further processing;

capturing fine particles of solid oxides suspended inside the processing chamber with a sweeper provide inside the processing chamber; and sweeping fine particles of solid oxides accumulated on a wall of the processing chamber with said sweeper.

2. A method for processing an exhaust gas produced during manufacturing of semiconductor devices according to claim 1, which comprises:

mixing the exhaust gas with air and oxygen gas before the exhaust gas, air and oxygen mixture is introduced into the processing chamber to obtain an exhaust gas air and oxygen mixture; and introducing said exhaust gas, air and oxygen mixture into the processing chamber and heated in said processing chamber.

3. A method for processing an exhaust gas produced during manufacturing of semiconductor devices according to claim 2, which comprises:

heating the exhaust gas, air and oxygen mixture in the processing chamber to a temperature of between about 150° C. and about 1,500° C.

4. A method for processing an exhaust gas produced during manufacturing of semiconductor devices according to claim 2, wherein:

the exhaust gas air and oxygen mixture is continuously introduced into the processing chamber; and a processed gas resulting from the continuous processing of the exhaust gas air and oxygen mixture in the processing chamber is continuously discharged.

5. A method for processing an exhaust gas produced during manufacturing of semiconductor devices according to claim 2, wherein:

a catalyst is held by said sweeper.

6. A method for processing an exhaust gas produced during manufacturing of semiconductor devices according to claim 2, wherein:

said sweeper is a rotating brush.

7. An apparatus for processing an exhaust gas produced during manufacturing of semiconductor devices comprising:

an exhaust gas chamber in which air and oxygen are mixed with said exhaust gas to form a mixture, an exhaust gas, air and oxygen mixture inlet in said processing chamber through which a thermally disintegratable or thermally oxidizable exhaust gas. air and oxygen mixture is introduced;

a heater which heats the exhaust gas, air and oxygen mixture in the processing chamber where said exhaust gas air and oxygen mixture undergoes thermal disintegration or thermal oxidation;

a processed gas outlet from which the processed gas resulting from the thermal disintegration or the thermal oxidation is discharged; and a sweeper provided in the processing chamber, said sweeper sweeps a wall of the processing chamber and captures fine particles of solid oxides suspended inside the processing chamber.

8. An apparatus for processing an exhaust gas produced during manufacturing of semiconductor devices comprising:

an exhaust gas mixture inlet in said exhaust gas processing chamber;

through which an exhaust gas mixture obtained by mixing a thermally disintegrable or thermally oxidizable exhaust gas produced during manufacturing of semiconductor devices with air and oxygen gas is introduced;

a heater which heats the exhaust gas, air and oxygen mixture in the processing chamber where said exhaust gas, air and oxygen mixture undergoes thermal oxidation;

a processed gas outlet in said processing chamber from which a processed gas resulting from the thermal disintegration or the thermal oxidation of the exhaust gas, air and oxygen mixture is discharged; and a sweeper provided in the processing chamber, said sweeper sweeping a wall of the processing chamber and capturing fine particles of solid oxides suspended inside the processing chamber.

9. An apparatus for processing an exhaust gas produced during manufacturing of semiconductor devices according to claim 8, further comprising an oxidation promoting gas inlet through which air and oxygen gas is introduced into an exhaust gas flow at a point before the exhaust gas, air and oxygen mixture goes into the processing chamber so that the exhaust gas is mixed with the air and the oxygen gas previous to entering the processing chamber.

10. An apparatus for processing an exhaust gas produced during manufacturing of semiconductor devices according to claim 7, wherein:

the processing chamber is formed inside a straight pipe which stands vertical;

the sweeper is provided in said straight pipe in such a way that the sweeper is rotatable around a center axis of the straight pipe; and a means for rotating the sweeper is further provided.

11. An apparatus for processing an exhaust gas produced during manufacturing of semiconductor devices according to claim 10, wherein the sweeper moves up and down between a top end and a bottom end of the straight pipe so that the sweeper sweeps fine particles of solid oxides accumulated on a wall of the processing chamber in a downward direction or an obliquely-downward direction.

12. An apparatus for processing an exhaust gas produced during manufacturing of semiconductor devices according to claim 7, wherein:

the processing chamber is formed inside a pipe;

the sweeper has a spiral shape so that the sweeper forms a spiral path for a gas flow inside said pipe;

said spiral-shaped sweeper is provided in such a way that the sweeper is rotatable around a center axis of the pipe; and a means for rotating the spiral-shaped sweeper is further provided.

13. An apparatus for processing an exhaust gas produced during manufacturing of semiconductor devices according to claim 12, wherein:

the processing chamber is formed in a straight pipe which stands vertical; and the spiral-shaped sweeper is rotated in such a way that the sweeper sweeps off fine particles of solid oxides accumulated on a wall of the processing chamber in a downward direction.

14. An apparatus for processing an exhaust gas produced during manufacturing of semiconductor devices according to claim 7, wherein the sweeper is a rotating brush or a slab-shaped brush.

15. An apparatus for processing an exhaust gas produced during manufacturing of semiconductor devices according to claim 7, further comprising:

a recovery tank provided below the processing chamber; wherein a bottom of the processing chamber is opened toward said recovery tank.

16. An apparatus for processing an exhaust gas produced during manufacturing of semiconductor devices according to claim 7, wherein a catalyst is held by the sweeper.

17. An apparatus for processing an exhaust gas produced during manufacturing of semiconductor devices according to claim 8, further comprising:

a means for mixing the exhaust gas with air and oxygen gas; wherein a gas mixture of the exhaust gas air and oxygen gas obtained by said mixing means is introduced into the processing chamber.

18. An apparatus for processing an exhaust gas produced during manufacturing of semiconductor devices according to claim 17, said mixing means comprising:

an air pump which draws in, pressurizes and discharges air; and an ejector which ejects the exhaust gas to the air which is being discharged from said air pump, thereby mixing them together, said ejector utilizing static pressure of the air.

19. An apparatus for processing an exhaust gas produced during manufacturing of semiconductor devices according to claim 17, said mixing means comprising:

an air pump which draws in air; and an ejector which ejects the exhaust gas to the air which is being inhaled by said air pump, thereby mixing them together, said ejector utilizing static pressure of the air.

20. An apparatus for processing an exhaust gas produced during manufacturing of semiconductor devices according to claim 18, further comprising:

a check valve or an open-close valve provided in a pressurized air discharging duct from the air pump or in an air intake duct to the air pump or in an exhaust gas introduction duct through which the exhaust gas is introduced into the ejector.

21. An apparatus for processing an exhaust gas produced during manufacturing of semiconductor devices according to claim 17, said mixing means comprising:

an air pump which draws in, pressurizes and discharges air; and a coupling which merges pressurized air discharged from said air pump and a pressurized exhaust gas and directs them to the processing chamber.

22. An apparatus for processing an exhaust gas produced during manufacturing of semiconductor devices according to claim 21, further comprising:

a check valve or an open-close valve provided in a pressurized air discharging duct from the air pump or in an air intake duct to the air pump, or in an exhaust gas introduction duct through which the exhaust gas is introduced into the coupling.

23. An apparatus for processing an exhaust gas produced during manufacturing of semiconductor devices according to claim 7, wherein a plurality of processing chambers are provided.

24. An apparatus for processing an exhaust gas produced during manufacturing of semiconductor devices according to claim 23, further comprising a means for supplementing air to at least one of the processing chambers at a second stage and beyond.

25. An apparatus for processing an exhaust gas produced during manufacturing of semiconductor devices according to claim 7, wherein the heater is provided around the processing chamber.

26. An apparatus for processing an exhaust gas produced during manufacturing of semiconductor devices according to claim 7, wherein the heater is provided inside the processing chamber.

27. An apparatus for processing an exhaust gas produced during manufacturing of semiconductor devices according to claim 8, wherein a plurality of heaters are provided both around and inside the processing chamber.

28. An apparatus for processing an exhaust gas produced during manufacturing of semiconductor devices according to claim 8, wherein the temperature of the heater is controlled.

29. An apparatus for processing an exhaust gas produced during manufacturing of semiconductor devices according to which includes a heater which heats air and oxygen gas which is introduced into the processing chamber, thereby heating the exhaust gas.

30. An apparatus for processing an exhaust gas produced during manufacturing of semiconductor devices according to claim 29, wherein the heating device is a heat exchanger which provides an exchange of heat between air and oxygen gas and the processed gas at a high temperature.

31. An apparatus for processing an exhaust gas produced during manufacturing of semiconductor devices according to claim 29, wherein the temperature of the heating device is controlled.

* * * * *